Patented Jan. 19, 1937

2,068,102

UNITED STATES PATENT OFFICE 2,068,102

FLUID CONTROL SYSTEM

Ernest Lamar Gaines, Seattle, Wash.

Application November 7, 1933, Serial No. 697,000

31 Claims. (Cl. 137—78)

This invention relates to fluid control systems and aims primarily to provide a fluid control system especially designed and adapted for structural incorporation in a wide variety of means, mechanisms, apparatus and devices, which, or parts of which, are required to function periodically or be energized, actuated, set in motion or otherwise successively influenced in accordance with a predetermined plan involving the proper timing of the controlling influence, with respect to both the starting time and the duration of functioning of each controlled device, feature, or period.

Broadly contemplated therefore by the present invention is the provision of a novel and improved fluid control system, embracing fluid pressure supply means and a plurality of control units or devices operable in sequence by the fluid pressure and rendered automatic in the performance of their several actions by the fluid pressure flowing thereinto, and therefrom, to thereby control the discharge or delivery of fluid from said supply means at a plurality of points, places, or stations, successively.

With the foregoing in view the invention essentially resides and is more particularly concerned in the provision of a fluid control system, which in its preferred embodiment is characterized by the employment of fluid pressure supply means having a plurality of discharge outlets leading therefrom, wherefrom the fluid is adapted to be discharged or delivered successively; a control unit or device for each of said discharge outlets, all of said units being interconnected for chain operation and each including means for storing energy derived from said fluid pressure and utilizing the same for actuating its succeeding unit, whereby the discharge or delivery of fluid from said discharge outlets is successively controlled or regulated as to time of occurrence and quantity and is dependent upon the flow of fluid from one outlet effecting actuation of the control unit of another outlet; and appliances or means whereby the offices of the above mentioned agencies are adjustably regulated to predeterminately control their respective actions, all of which are to be correlated in the broad aim of enhancing the efficiency of the present novel fluid control system for the various uses and purposes for which it is primarily designed and intended.

The above, and additional objects which will hereinafter be more specifically treated are attained by such means as are shown in the accompanying drawings, described in the following specification and then more clearly pointed out in the claims, which are appended hereto and form part of this specification.

With reference to the drawings, in which there are illustrated several embodiments of the invention, and throughout the several views of which like characters of reference designate similar parts.

Figures 1, 3:
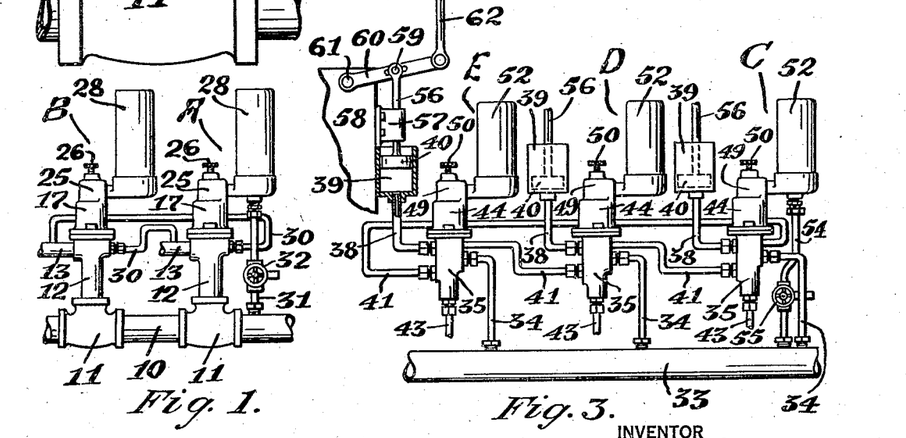
Figure 1 is a side elevation of a fluid control system comprehended by the present invention.
Fig. 3 is a side elevation of another form of fluid control system.
Figure 2:
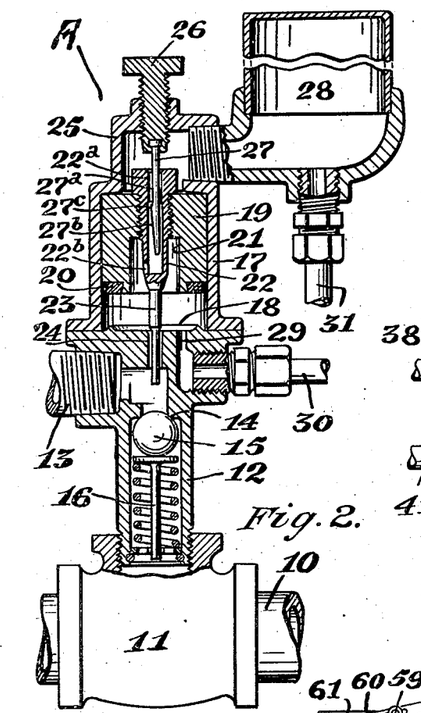
Fig. 2 is a vertical longitudinal section of one of the units of same, certain parts being in elevation.

Beginning now the more detailed description of the invention by reference to the accompanying drawings, and referring here more particularly to the fluid control system illustrated in Figs. 1 and 2, wherein the numeral 10 designates a fluid pressure supply pipe having a series of interconnected control units or devices connected therewith or interposed therein and herein designated by the reference characters A and B, and inasmuch, as both of these units are identical in construction, a description of one will suffice for both.

In the present instance the control unit A is connected to the supply pipe 10 by a connecting T 11, and threadedly engaged within the upper branch of said T in axial prolongation thereto is the inlet end of an upwardly extending vertically disposed valve casing 12 having a discharge pipe 13 conected to its outlet formed within said casing adjacent its upper end in perpendicular relation to its axis. Interposed between the inlet and outlet ends of the casing 12 is a valve seat 14, whereon a ball valve 15 is adapted to normally seat and is yieldingly maintained upon said seat by a spring-pressed guide 16 slidably mounted for axial movement within the lower portion of said casing, substantially in the manner illustrated in Fig. 2. The discharge pipe 13 is connected at its outer end to the apparatus, device or mechanism to be controlled, as for example, a sprinkling unit, hydraulically actuated unit, or the like, not shown.

Rigidly secured, in any well known manner, to the upper end of the valve casing 12, is the control mechanism of the unit A comprising a cylinder 17, the lower open end of which is adapted to abut and be normally closed by the upper end of the valve casing 12, which latter, for a purpose about to be described, is provided with an annular seat 18. Mounted for reciprocation within the cylinder 17 is a piston 19 having at its lower end a sealing or packing ring 20, preferably fabricated from rubber, adapted when the piston 19 is in its lowermost or advanced position to abut the annular seat 18 and provide a sealing contact thereat or therewith. Formed within the piston 19 is a counterbore 21 and threadedly mounted within the smaller or upper bore of the same to extend downwardly through the piston 19 is a sleeve 22 having a push rod 23 extending downwardly from its lower end in axial prolongation thereto, the lower end portion of said push rod 23 being slightly reduced in diameter and being adapted to normally project downwardly into the upper end of the valve casing 12 through an axial opening 24 formed therein, said opening being slightly larger in diameter than the slightly reduced portion of the push rod 23, for a purpose which will hereinafter be made more apparent, while the upper portion of said push rod 23 is approximately the same diameter as the opening 24, so that said upper portion substantially fills the same, when the piston 19 is in its lowered or advanced position. The sleeve 22 at its upper end is provided with a slightly constricted bore portion 22a and at its lower end is provided in its side walls with an opening 22b, whereby communication is established between the bore of said sleeve and the lower or enlarged bore of the counterbored portion of the piston 19.

Formed upon the upper end of the cylinder 17 is an extension 25 of slightly reduced diameter and threadedly mounted for axial adjustment within the upper wall of said extension, in axially aligned relation to the cylinder 17, is an adjusting screw 26 from the lower or inner end of which depends, in free swivelling relation thereto a needle or stem 27, the lower major portion of which normally extends downwardly within the sleeve 22 and conjointly therewith forms a valve, for regulating the flow of fluid through the sleeve in either direction, and for this purpose the cylindrical periphery of said needle is provided lengthwise on one side thereof with an upper flattened portion 27a, the face of which is parallel with the axis of the needle, and a lower flattened portion 27b, the face of which is inclined or convergent with said axis, while, intermediately of said flattened portions, a portion 27c substantially the full diameter of the needle is provided or retained thereat or thereon, which portion 27c is adapted to closely fit the constricted portion 22a of the bore of the sleeve 22 in certain adjusted positions of the needle 27 therein.

Communicating with the extension 25 of the cylinder 17, at one side thereof, is a compression chamber 28, which latter, in the present instance, is threadedly connected to said extension in the manner more clearly shown in Fig. 2.

Formed within the upper portion of the valve casing 12 and communicating at its inner end with the cylinder 17 is a passageway 29, the outer end of which is connected by a tube 30 to the discharge pipe 13 of the adjacent control unit B, of the interconnected series of units, whereby operation of the same effects sequential actuation of the control unit A.

The numeral 31 designates a starting pipe having a three-way valve 32 interposed therein, said pipe being connected at one end to the fluid pressure supply pipe 10 and at its other or opposite end to the compression chamber 28 of the unit A.

Before proceeding to a description of the operation of the interconnected control units A and B I desire to state that while I have herein shown and described a control system having two units interconnected in series, it is to be understood that the present invention contemplates a control system having any number of such units interconnected in series and operating in sequence the present disclosure being merely by way of illustration.

To start the operation of the control system the three-way valve 32 is manually actuated to permit fluid to pass from the supply pipe 10 to the compression chamber 28 of the unit A through the starting pipe 31, which fluid upon entering said chamber 28 causes compression of the air therein, and simultaneously therewith such fluid also forces the piston 19 downwardly until its packing ring 20 abuts the seat 18, and in so doing the lower or inner end of the push rod 23 contacts the ball valve 15 and unseats the same, thus permitting the fluid from the supply pipe 10 to pass into the discharge pipe 13, following which the three-way valve 32 is manually moved to its closed position. Upon closing of the valve 32 the compressed air in the compression chamber 28 slowly forces the fluid therefrom downwardly through the valve restricted bore of the sleeve 22 meanwhile maintaining the piston 19 upon its seat 18. The fluid flowing downwardly through the bore of the sleeve 22 passes outwardly therefrom through the opening 22b into the counterbore 21 of the piston 19, from whence it passes through the passageway 29 and tube 30 and is exhausted to the discharge pipe 13 of the control unit B, which latter is inactive at this time and in consequence its discharge pipe 13 is open to the atmosphere. The flow of fluid from the compression chamber 28 continues until the air pressure therein is practically exhausted, at which time, the spring-pressed guide 16 simultaneously raises the piston 19 off its seat 18 and seats the ball valve 15 thereby closing its discharge pipe 13. During this time some of the fluid passing through the discharge pipe 13 of the unit A is by-passed through the tube 30 and passageway 29 of the unit B into the cylinder 17 of the same raising its piston 19 to the position indicated in Fig. 2 and at the same time such fluid passes through the sleeve 22 of said piston into the compression chamber 28 of the unit B causing compression of the air therein, which flow continues until the pressure therein equals the pressure in the discharge pipe 13. Closing of the ball valve 15 of the unit A, as above described, causes dropping of the pressure in its discharge pipe 13 to atmosphere, whereupon such flow is reversed and the piston 19 of the unit B is forced downwardly by the fluid under pressure in its chamber 28 and the cycle of operation hereinbefore described for the unit A is repeated in unit B. Obviously, the units A and B will alternately operate until such time as the three-way valve 32 is actuated to open the compression chamber of unit A to the atmosphere, said valve being left in such open position until the control system is rendered inactive.

During the operation of the above described fluid control system the timing of the units A and B thereof is regulated and controlled by their adjusting screws 26, which latter raises or lowers their correlated dependent needles 27 within their sleeves 22, thus varying the size or area of the passageways between said needles and bores of said sleeves and in consequence control the rate of flow of the fluid therethrough to and from the compression chambers 28. Manifestly, therefore, by adjusting the screws 26 upwardly the flow of fluid through the sleeves 22 is accelerated and by adjusting said screws downwardly such flow is retarded, thus decreasing and increasing the time of operation of each of the units A and B. By fabricating the bores of the sleeves 22 and their correlated needles 27 in the manner herein illustrated and described, such construction is self-cleaning, inasmuch as the sleeves moving up and down upon their needles, the latter keep the slightly restricted upper portions 22a of the bores of said sleeves free of any obstruction. Furthermore, such construction permits of more rapid flow of the fluid into the compression chambers 28 and slower flow outwardly therefrom, by reason of the varying positions of the sleeves 22 relative to the needles 27 in addition to the adjusting of the latter by the screws 26.

For a clearer and readier understanding of the construction and operation of the control units A and B, it should be here noted and observed that their respective pistons 19 assume on occasion different positions depending upon whether their correlated fluid control system is inactive or active, as for example, when such system is inactive the pistons 19 are in a lowered intermediate position with the inner terminals of their push rods 23 resting upon their respective ball valves 15, which at this time are in seated relation within their valve casings 12 due to the upward pressure of the spring-pressed guides 16 upon said ball valves and the fluid pressure in the supply pipe 10. When the control system is in operation the pistons 19 of the units A and B are alternately or successively in their lowermost position due to the compressed air in their respective compression chambers 28, which air causes the pistons 19 to abut their annular seats 18 and at the same time causes the push rods 23 to unseat their ball valves 15. Again, when the control system is in operation the pistons 19 of the units A and B are alternately or successively in their uppermost or retracted positions illustrated in Fig. 2 due to the fluid under pressure passing to their compression chambers 28 from their tubes 30.

Figure 4:
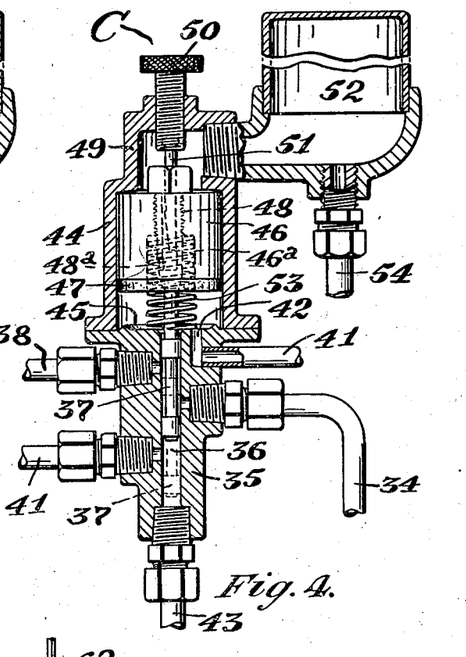
Fig. 4 is a vertical longitudinal section of one of the units of same, certain parts being in elevation.

In the fluid control system illustrated in Figs. 3 and 4, the numeral 33 designates a fluid pressure supply pipe to which are connected at suitably spaced intervals, as by pipes or tubes 34, a series of interconnected control units herein designated by the reference characters C, D and E, and inasmuch as all of these units are identical in construction, a description of one will suffice for all.

In the present instance the control unit C is provided with a valve casing 35 having an axially disposed bore 36 extending therethrough, which bore is connected intermediately its length to the fluid pressure supply pipe 33 by the pipe or tube 34 above described. Mounted for reciprocative movement within the bore 36 is a piston valve 37, of the balanced type, adapted to control and regulate the flow of fluid from the pipe or tube 34 in a manner which will hereinafter be made more apparent.

Connected to the opposite side of the bore 36, at a point therein slightly above the connection of the pipe 34, is a pipe 38 which leads to the apparatus, mechanism, or device to be controlled, as for example, a hydraulic cylinder 39 having a piston 40 reciprocatively mounted therein, and similarly connected to said opposite side of the bore 36, at a point therein slightly below the connection of the pipe 34 is a pipe 41, which leads to and is connected at its other or opposite end to a passageway 42 leading to the time control mechanism of the unit D, it being here noted and observed that the pipe 41 leading from the valve casing of the unit D is similarly connected to the passageway 42 leading to the time control mechanism of the unit E, and that the pipe 41 leading from the valve casing of the latter unit is connected to the passageway 42 leading to the time control mechanism of the unit C, in other words, it will be manifest and apparent that the pipes 41 serve and function as the interconnecting media between the series of units C, D, and E.

Connected to the lower end of the bore 36 of the valve casing 35 and extending downwardly therefrom in axial prolongation thereto is a drain pipe 43.

Fixedly secured, in any suitable manner, to the upper end of the valve casing 35 is the control mechanism of the unit C, which control mechanism is substantially identical in construction to that hereinbefore described for the units A and B of the control system illustrated in Figs. 1 and 2, and hence embraces a control cylinder 44 fixedly secured to the upper end of the valve casing 35, which latter is provided with an annular seat 45, said cylinder having a valve control piston 46 reciprocatively mounted therein and provided at its lower end with a sealing or packing ring 47 adapted when the piston is in its lowermost or advanced position to abut said annular seat 45 and thus provide a sealing contact therebetween. The valve control piston 46 is provided with a counterbore 46a within the upper end of which is threadedly secured a sleeve 48, to the lower or inner end of which is integrally or otherwise rigidly connected the upper end of the piston valve 37. The sleeve 48 adjacent its lower end is provided in its side walls with an opening 48a, whereby communication is established between the bore of said sleeve and the counterbore 46a of the piston 46. The control cylinder 44 at its upper end has an extension 49, an adjusting screw 50, a depending swivel needle valve 51, and a compression chamber 52 all identical in construction and function to those hereinbefore described for the units A and B.

To maintain the piston valve 37 and its interconnected actuating or control piston 46 in the elevated position illustrated in Fig. 4, when the fluid control system is inactive, I provide a compression spring 53 and interpose the same between the upper end of the valve casing 35 and the upper end of the larger bore of the counterbore 46a, all as more clearly shown in Fig. 4.

The numeral 54 designates a starting pipe having a three-way valve 55 interposed therein, said pipe being connected at its lower end to the fluid supply pipe 33 and at its upper or opposite end to the compression chamber 52 of the unit C.

Returning now to a further description of the hydraulic cylinders 39 and pistons 40 and to the devices actuated or controlled thereby, said pistons are provided with upwardly extending piston rods 56, which latter at their upper or outer ends may be connected in any approved or suitable manner to the devices to be actuated or controlled, as for example, I have illustrated the piston rod 56 of the unit E, in Fig. 3, as slidably mounted within a guide bracket 57, which is fixedly secured to a support or frame 58, said piston rod at its upper end being pivotally connected, as at 59, to an intermediately slotted oscillative lever or arm 60, which is mounted for oscillative movement at its inner end, as at 61, upon the support 58 and upon its outer or free end has an actuating rod 62 pivotally connected thereto, which rod leads to the device to be actuated, as for example, any mechanism requiring intermittent or periodic actuation, preferably of the self-return type.

In initiating or starting the operation of the fluid control system illustrated in Figs. 3 and 4, assuming that fluid pressure has been admitted into the supply pipe 33, then, and in that event, such fluid pressure passes upwardly through the pipes 34, of each of the units C, D, and E, into their valve casings 35 from whence it passes through the pipes 38 to the hydraulic cylinders 39 and elevates or raises the pistons 40 therein, this by reason of the fact that the valve control pistons 46 of such units, due to the action of their respective springs 53, are in an elevated position, as shown in Fig. 4, and in consequence establish communication between the pipes 34 and 38, as indicated. With the several moving parts of the fluid control system in the positions above described, the three-way valve 55 is manually actuated to permit fluid pressure to pass from the supply pipe 33 to the compression chamber 52 of the unit C through the starting pipe 54, which fluid pressure upon entering said chamber compresses the air therein and simultaneously forces the valve control piston 46 downwardly upon its seat 45 against the action of its spring 53 and in so doing its correlated piston valve 37 cuts off the flow of fluid pressure through the pipe 38 and diverts such flow to the pipe 41, wherethrough said fluid pressure passes to the control cylinder 44 of the unit D, wherein it passes through the sleeve 48 of same into the compression chamber 52 of said last mentioned unit to effect compression of the air therein. When the flow of fluid pressure is diverted from the pipe 38 to the pipe 41 of the unit C, as above described, such pipe 38 then communicates with the passageway 42, so that the fluid in the hydraulic cylinder 39 of the unit C is released therefrom and exhausted through said passageway 42 and its correlated pipe 41 to the valve casing 35 of the unit E from whence it is exhausted to the atmosphere through the drain pipe 43. Upon completion of the compression of the air in the chamber 52 of the unit C, the three-way valve 55 is manually closed following which the air in the compression chamber 52 of the unit C slowly forces the fluid therefrom downwardly through the sleeve 48 and out through the passageway 42 and pipe 41 to the valve casing 35 of the unit E through which it passes to the drain pipe 43 thereof. During this time the piston 40 of the unit C is in its lowered position, but, upon relieving the compression on the air in the chamber 52 of the unit C, as just described, the compression spring 53 of such unit functions to elevate its correlated piston 46 and piston valve 37, which latter action cuts off the flow of fluid pressure through the pipe 41 to the compression chamber 52 of the unit D and diverts such flow to the pipe 38, wherethrough it passes to the hydraulic cylinder 39 of the unit C and elevates the piston 40 therein, which in turn actuates in one direction its interconnected self-return mechanism, not shown. Upon elevation of the piston valve 37 of the unit C, as above described, the fluid in the hydraulic cylinder 39 of the unit D is released therefrom and exhausted through the pipe 38, control cylinder 44, passageway 42 and pipe 41 of same to the valve casing 35 of the unit C from whence it is exhausted to the atmosphere through the drain pipe 43 of said unit, and as such fluid is released from said hydraulic cylinder 39 the piston 40 of the latter is lowered therein. When the flow of fluid pressure to the compression chamber 52 of the unit D is cut off in the manner above described, the air under compression in such chamber forces or moves the piston 46 thereof down upon its seat 45 against the action of the piston spring 53 and also slowly forces the fluid from said chamber downwardly through the sleeve 48, passageway 42 and pipe 41 of such unit to the valve casing 35 of the unit C, through which it passes to the drain pipe 43 thereof. The above described downward movement of the piston 46 of the unit D also obviously effects simultaneously similar movement of its interconnected or related piston valve 37, which movement of the latter cuts off the flow of fluid pressure through the pipe 38 of the unit D and diverts the same to the pipe 41 thereof, wherethrough said fluid pressure passes to the control cylinder 44 of the unit E, wherein it passes through the sleeve 48 of same into the compression chamber 52 of said last mentioned unit to effect compression of the air therein. During this time the piston 40 of the unit D is in its lowered position in its cylinder 39, but, upon relieving the air compression in chamber 52 of said unit, as above set forth, the compression spring 53 of such unit functions to elevate its correlated piston 46 and piston valve 37, thereby cutting off the flow of fluid pressure through the pipe 41 to the compression chamber 52 of the unit E and diverting such flow to the pipe 38, wherethrough it passes to the hydraulic cylinder 39 of the unit D and elevates the piston 40 therein, which in turn actuates in one direction its interconnected self-return mechanism, not shown. Upon elevation of the piston valve 37 of the unit D, as just described, the fluid in the hydraulic cylinder 39 of the unit E is released therefrom and exhausted through the pipe 38, control cylinder 44, passageway 42 and pipe 41 of same to the valve casing 35 of the unit D from whence it is exhausted to the atmosphere through the drain pipe 43 of said last mentioned unit, and as such fluid is released from said hydraulic cylinder 39 the piston 40 therein is lowered. Upon cutting off the flow of fluid pressure to the compression chamber 52 of the unit E, in the manner above set forth, the air under compression therein forces the piston 46 of said unit down upon its seat 45 against the action of the piston spring 53 and slowly forces the fluid from said chamber downwardly through its related sleeve 48, passageway 42 and pipe 41 to the valve casing of the unit D, through which it passes to the drain pipe 43 thereof. Downward movement of the piston 46 of the unit E also effects simultaneous downward movement of its related piston valve 37, which latter cuts off the flow of fluid pressure through the pipe 38 of the unit E and diverts the same to the pipe 41 thereof, wherethrough said fluid pressure passes to the control cylinder 44 of the unit C, wherein it passes through its sleeve 48 into its compression chamber 52 to effect compression of the air therein, and thus commence another cycle of operation of the fluid control system comprising the units C, D and E. During the above described period, the piston 40 of the unit E is in its lowered position in its cylinder 39, but, upon relieving the air compression in chamber 52 of said unit, as hereinbefore set forth, the compression spring 53 of such unit functions to elevate its correlated piston 46 and piston valve 37, thereby cutting off the flow of fluid pressure through the pipe 41 to the compression chamber 52 of the unit C and diverting such flow to the pipe 38, wherethrough it passes to the hydraulic cylinder 39 of the unit E and elevates the piston 40 therein which in turn imparts rectilinear movement to the rod 62 to actuate in one direction the self-return mechanism connected therewith, not shown. Upon elevation of the piston valve 37 of the unit E, in the manner set forth, the fluid in the hydraulic cylinder 39 of the unit C is released therefrom and exhausted through its pipe 38, control cylinder 44, passageway 42 and pipe 41 of the same to the casing 35 of the unit E, wherefrom it is drained through the drain pipe 43 of the latter, and as such fluid is released from said hydraulic cylinder 39 its piston 40 is lowered therein by the self-return mechanism interconnected therewith, not shown. The above described cycle of operation of this fluid control system is successively repeated until such time as the three-way valve 55 is manually actuated to directly open the compression chamber 52 of the unit C to the atmosphere, and such valve is left open until the control system is rendered inactive.

During the operation of the above described fluid control system, timing of the units C, D and E thereof is regulated and controlled by their adjusting screws 50, which latter raise and lower their correlated dependent needles 51 within their sleeves 48, thus varying the size or area of the passageways through the latter and in consequence governing the rate of flow of the fluid therethrough to and from their related compression chambers 52.

Figure 5:
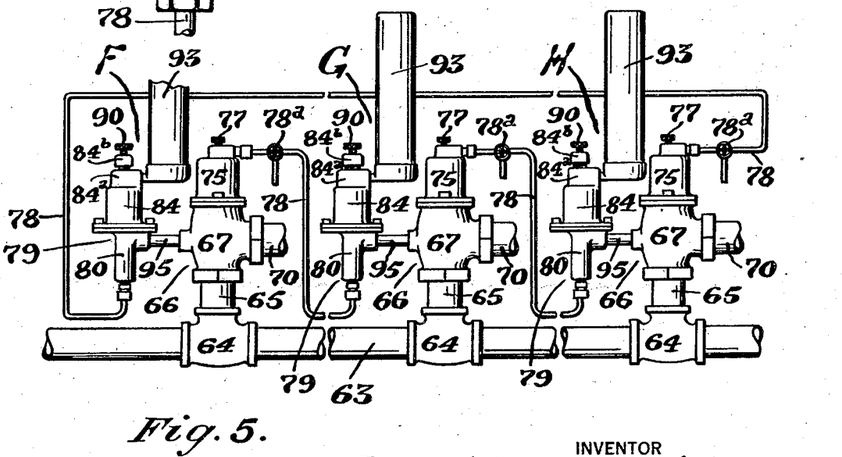
Fig. 5 is a side elevation of still another form of fluid control system.
Figure 6:
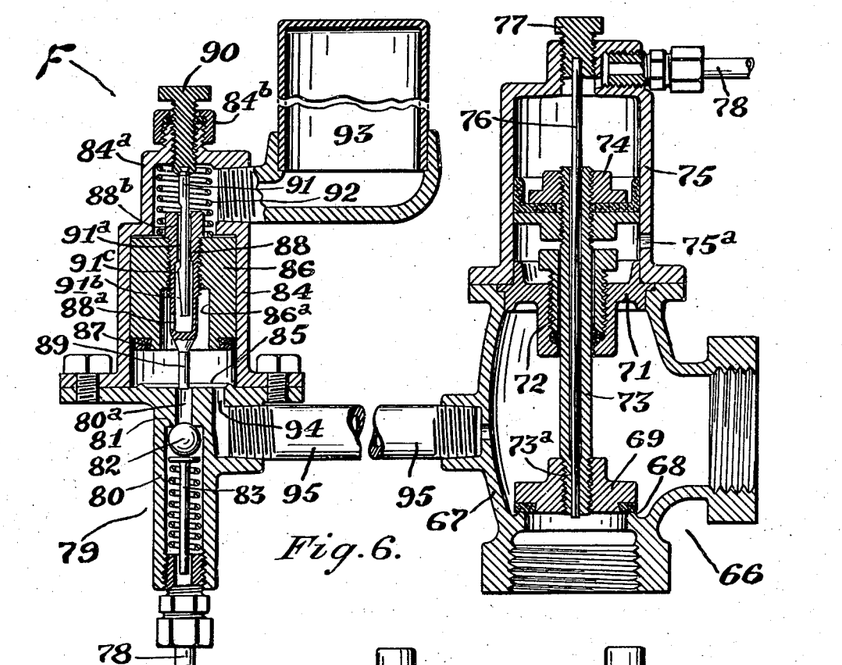
Fig. 6 is a vertical longitudinal section of one of the units of same, certain parts being in elevation.

In the fluid control system illustrated in Figs. 5 and 6, the numeral 63 designates a fluid pressure supply pipe having a series of T's 64 interposed therein at suitably spaced intervals, to which are connected, as by nipples 65, discharge valves 66 adapted to be controlled and regulated in their action by control units herein generally designated by the reference characters F, G and H, respectively, and inasmuch as these discharge valves and their correlated control units are identical in construction, a description of the discharge valve at the right-hand side of Figs. 5 and 6 and the control unit F at the left-hand side of same, which is adapted to regulate and control the action of said discharge valve will suffice for all.

The discharge valve 66 comprises an angular valve body 67 having a valve seat 68 formed in the inlet end thereof upon which seats a disk valve 69 for controlling the flow of fluid therethrough. Connected to the outlet end of the valve body is a discharge pipe 70 which leads to a sprinkling unit, or the like, not shown. Snugly fitting within the upper end of the valve body 67 is a cover or partition 71 provided with a stuffing box 72.

Threadedly secured in concentric relation within the disk valve 69 and extending upwardly therefrom in axial prolongation thereto, through the stuffing box 72, is a hollow or tubular valve stem 73, the upper end of which is similarly secured to a piston 74 reciprocatively disposed within a discharge valve control cylinder 75 fixedly secured, in any well known manner, at its lower end upon the upper end of the angular valve body 67, and serves and functions thereat to positively maintain and retain the partition 71 in seated relation within the upper end of said body, all as more clearly shown in Fig. 6. It is to be here noted and observed that the piston 74 is of slightly greater diameter or area than the disk valve 69, this for the reason, that the function of said piston 74 is to close said disk valve against the fluid pressure in the supply pipe 63, and inasmuch as the same pressure per square inch of area impinges both the piston 74 and the disk valve 69, said piston must of necessity have the greater area. The bore of the hollow or tubular valve stem 73 is slightly constricted at its lower end, as at 73a, for a purpose shortly to be described. A vent hole or aperture 75a is provided in the walls of the control cylinder 75 adjacent the lower end thereof, to thereby obviate the formation of a vacuum or back pressure therein beneath the piston 74.

Axially disposed within the bore of the tubular valve stem 73 and normally extending therethrough is a stationary needle 76 of uniform diameter throughout the length thereof, which needle at its upper terminal is fixedly secured within a plug 77 threadedly and concentrically secured within the upper end wall of the control cylinder 75. As above stated the needle 76 is of uniform diameter and the above described constricted portion 73a of the bore of the stem 73 is only slightly larger in diameter than said needle, this in order to provide a restricted annular passageway for the fluid therebetween and also effect self-cleaning of the portion 73a by the relative movement of the valve stem 73 upon the fixed needle 76, as will be manifest and apparent.

Communicating with the upper end of the discharge valve control cylinder 75 is one end of a pipe or tube 78, the other or opposite end of which communicates with the inlet end of the pilot valve, of the control unit F of the discharge valve now being described, which pilot valve is herein generally designated by the numeral 79, and will now be described, said pipe 78 having a manually operable three-way valve 78a interposed therein.

The pilot valve 79 comprises a vertically disposed valve casing 80 having a valve seat 81 formed therein adjacent the upper end thereof, whereon a ball valve 82 is adapted to normally seat and is yieldingly maintained upon said seat by a spring-pressed guide 83 slidably mounted for axial movement within the lower portion of said casing 80, substantially in the manner shown in Fig. 6.

Rigidly secured, in any well known manner, to the upper end of the valve casing 80, is the pilot valve control mechanism of the unit F, comprising a pilot valve control cylinder 84, the lower open end of which is adapted to abut and be normally closed by the upper end of the valve casing 80, which latter is provided with an annular seat 85 for a purpose now to be set forth. Mounted for reciprocation within the pilot valve control cylinder 84 is a piston 86 having as its lower end a packing or sealing ring 87 adapted when the piston 86 is in its lowermost or advanced position to abut the annular seat 85 and provide a sealing contact therebetween. Formed within the piston 86 is a counterbore 86a and threadedly secured within the smaller or upper bore thereof to extend downwardly through the piston 86 is a sleeve 88 having a push rod 89 extending downwardly from its lower end in axial prolongation thereto and during downward movements of the piston 86 is adapted to project downwardly into the upper end portion of the bore of the valve casing 80 through a central aperture 80a formed within the upper end wall of said casing, the diameter of which aperture is slightly larger than said push rod. The sleeve 88 at its lower end is provided in its side walls with an opening 88a whereby communication is established between the bore thereof and the counterbore 86a of the piston 86. As now constructed and for a purpose which will shortly be made more apparent the upper end portion of the bore of the sleeve 88 is slightly constricted, as at 88b.

Formed upon the upper end of the pilot valve control cylinder 84 is an extension 84a of slightly reduced diameter and threadedly mounted for axial adjustment within the upper wall of said extension in axially aligned relation to the cylinder 84 is an adjusting screw 90, from the lower end of which loosely depends a needle or stem 91, the major portion of which normally extends downwardly within the sleeve 88 and conjointly with the latter forms and provides a valve for regulating the flow of fluid through such sleeve in either direction, and for this purpose said needle is provided with flattened portions 91a and 91b, respectively, at one side thereof and intermediately of said portions is provided with a portion 91c of substantially full diameter, which portion loosely fits the constricted portion 88b of the bore of the sleeve 88 when the piston 86 is in its lowered position. To positively prevent leakage of air around the adjusting screw 90 I provide the extension 84a exteriorly thereof with a stuffing box 84b. To normally maintain the piston 86 in an intermediate lowered position, so that the portion 91c of the needle 91 will be normally within the constricted portion 88b of the bore of the sleeve 88 I provide a compression spring 92 and interpose the same between the upper end of said piston 86 and the upper end wall of the extension 84a, this in order to materially retard the upward flow of fluid through the sleeve 88 unless when said fluid is under normal operating pressure. Communicating with the extension 84a, at one side thereof, is a compression chamber 93, which latter is threadedly connected thereto, as shown in Fig. 6.

Formed within the upper end portion of the pilot valve casing 80, in spaced parallel relation to the bore thereof, and communicating at its upper end with the pilot control cylinder 84 is a passageway 94, the lower end of which is connected by a pipe 95 to the angular valve body 67 of the discharge valve 66 of the unit F at the left-hand side of Figs. 5 and 6, for establishing communication between the discharge side of said valve and said pilot valve control cylinder, so that fluid may be by-passed from such valve to such cylinder during operation of the unit F and thus effect filling of the compression chamber 93 of the control unit F.

Before passing to a description of the operation of this fluid control system, I desire to state that the pistons 86 of the pilot valve controls thereof assume three distinct positions during a cycle of operation of the fluid control system, as follows:—(1) Their uppermost positions as shown in Fig. 6, which positions are assumed at the time fluid under pressure from the pipes 95 is passing through the control mechanisms to the compression chambers 93, at which time, the springs 92 are fully compressed and the needle valves 91 are in full open position relative to the bores of the sleeves 88. (2) Their lowermost positions which they assume when the pressure on the fluid in the pipes 95 is released to permit of the fluid under pressure in the compression chambers 93 to flow therefrom through said pipes 95 to the atmosphere. (3) Their intermediate positions, which are assumed when the pressure on the air in the compression chambers 93 has been relieved to the point where the spring-pressed ball valves 82 are seated causing the push rods 89 to elevate the pistons 86 from their lowermost positions to their intermediate positions, said pistons 86 remaining in their intermediate positions until fluid pressure is again applied thereto through pipes 95, when their correlated discharge valves 66 are again operated.

In initiating operation of this fluid control system, fluid under pressure is admitted to the supply pipe 63 and passes upwardly from said supply pipe to the discharge valves 66 unseating the disk valves 69 thereof and simultaneously elevating their interconnected pistons 74 within their control cylinders 75, and inasmuch as all the valves 66 are now open the fluid at a considerably reduced pressure passes therefrom through their respective discharge pipes 70 to the sprinkling units, or the like, not shown, which latter impede the flow of the fluid to the atmosphere and thereby produce some back pressure under the disk valves 69, thus causing some of the fluid to pass upwardly through the tubular valve stems 73 to the upper ends of the cylinders 75, wherein such fluid exerts a downward pressure upon the pistons 74 depressing same within their cylinders 75 and thereby effect seating of the disk valves 69. In the meantime, some of the fluid has passed through the pipes 95 to the pilot control valve cylinders 84 partially elevating the pistons 86 therein, but, due to the low pressure of such fluid the springs 92 hold said pistons 86 down, so that the needle valves 91 are substantially in their closed positions relative to their sleeves 88, thus practically shutting off flow of fluid into the compression chambers 93. With all the discharge valves 66 closed, as above described, the fluid control system may be started by opening any one of the three-way valves 78a to the atmosphere, thereby relieving pressure of the fluid upon the correlated piston 74 thereof and thus permit the fluid pressure in the supply pipe 63 to again unseat its interconnected disk valve 69. For a clearer and readier understanding of the operation of the fluid control system, let it be assumed that the three-way valve 78a at the right-hand side of Fig. 5 has been opened to the atmosphere, then, and in that event, the fluid under pressure in the control cylinder of its interconnected discharge valve 66 is exhausted through said three-way valve to the atmosphere and simultaneously therewith the fluid under pressure in the supply pipe 63 unseats the disk valve 69 of said discharge valve 66, whereupon said fluid, under full operating pressure, flows through the discharge pipe 70 to its sprinkler unit, not shown, and simultaneously therewith through the pipe 95 into the pilot valve control cylinder 84 of the unit H and fully elevates the piston 86 therein against the action of its compression spring 92, said fluid also flows through the needle valve controlled sleeve 88 into the compression chamber 93 of said unit H compressing the air therein, and said fluid continues to flow into said chamber until such time as the air pressure therein is equal to the pressure of the fluid in the pipe 95 interconnected therewith, following which the three-way valve 78a at the right-hand end of Fig. 5 is closed to the atmosphere and opened to the pilot valve of the unit F, which at this time is in its closed position. Upon closing of said three-way valve 78a to the atmosphere fluid pressure is again built up in the control cylinder 75 of the adjacent discharge valve 66 through its tubular valve stem 73 and again causes closing of the disk valve 69 thereof and establishment of atmospheric pressure in the pipes 70 and 95, respectively, of said discharge valve, as well as beneath the piston 86 of the pilot valve control of the unit H, following which the compressed air in the chamber 93 of said unit acts to fully depress its related piston 86, and upon such depression being effected full automatic actuation of the fluid control system has been instituted, by reason of the fact, that the push rod 89 of said piston has unseated or opened its pilot or ball valve 82, and relieved the pressure in the control cylinder 75 of the central discharge valve 66 connected therewith, which pressure is exhausted to the atmosphere through its correlated pipe 78, the pilot valve 79 and the pipe 95 of the unit H, the right-hand discharge valve 66 and its discharge pipe 70.

Upon release of the pressure in the control cylinder 75 of the central discharge valve 66, as above described, said discharge valve is opened and fluid flows therefrom through its discharge pipe 70 to the sprinkling unit, or the like, not shown, and at the same time the air in the compression chamber 93 of the unit G is compressed in the identical manner hereinbefore described for the unit H, and in the meantime the fluid in the compression chamber 93 of the latter unit escapes or is exhausted slowly to the atmosphere through its needle valve controlled sleeve 88, its correlated pipe 95, the discharge valve 66 at the right hand side of Fig. 5 and its discharge pipe 70, until such time, as the downward pressure on the pilot valve control piston 86 of the unit F is so reduced, that the spring-pressed guide 83 seats the ball valve 82 and raises said piston to its intermediate position, the closing of said ball valve results in the closing of the central discharge valve 66 in the identical manner hereinbefore described for the discharge valve 66 at the right hand side of Fig. 5, and in consequence the shutting off of the fluid to the sprinkling unit of said central discharge valve. Closing of the central discharge valve re-establishes atmospheric pressure therein and hence the compressed air in the chamber 93 of the unit G depresses its correlated pilot valve control piston 86 and opens the ball valve 82 thereof, which in turn causes exhaustion or release of fluid pressure in the control cylinder 75 of the discharge valve at the left hand side of Fig. 5, and the compression of the air in the compression chamber 93 of the unit F, in the identical manner hereinbefore described for the corresponding cylinder of the central discharge valve and the compression chamber 93 of the unit G, it being here remembered that opening of the discharge valve at the left hand side of Fig. 5 supplies fluid to its discharge pipe 70 and the sprinkling unit of same, not shown. The discharge valve 66 at the left hand side of Fig. 5 remains open until the pilot valve 82 of the unit G is closed by reason of the exhaustion of the air pressure in its compression chamber 93 effected in a similar manner hereinbefore described for the unit H, and upon the closing of said pilot valve of the unit G, pressure is again built up in control cylinder 75 of the discharge valve 66 at the left hand side of Fig. 5 causing the closing of the same and re-establishment of atmospheric pressure therein, all as hereinbefore described for the right hand and central discharge valves. In a like manner the compressed air in the chamber 93 of the unit F causes depression of its piston 86 and the opening of its pilot valve 82, to thereby relieve the pressure in the control cylinder 75 of the discharge valve 66 at the right hand end of Fig. 5, thereby causing the initial automatic opening of said discharge valve, and completing the cycle of operation of the fluid control system illustrated in Fig. 5.

The time of operation of the control units F, G and H is regulated and governed by the rate of discharge of fluid from their respective compression chambers 93, which in turn is determined by the relative positions of the needle valves 91 in their correlated sleeves 88, which needle valves are axially adjusted therein by the screws 90 to secure the desired periods of operation of the sprinkling units, not shown.

In the foregoing disclosure I have elected to show and describe this fluid control system as having three control units and three discharge valves, but, it is to be understood that such system may have any number of such units and valves, the present showing being merely by way of illustration. Further, while I have herein illustrated and described a specific type of discharge valve 66 as incorporated in the present fluid control system, it is also to be understood that various other types of hydraulically controlled or actuated valves may be substituted therefor. Furthermore, while I have herein shown and described each discharge valve 66 as provided with an individual control unit I desire to have it understood that several of such discharge valves may be regulated by a single control unit, the present showing being merely for clarity of illustration.

The fluid control system of the present invention has many important uses and is readily and particularly adaptable for incorporation in intermittently operated sprinkling apparatus for purifying water, sewage affluent and other liquids; for cooling buildings and wetting the roofs of same as a fire protection; for wetting combustible materials; for wetting newly laid concrete work to effect the curing and setting of same; for garden, lawn and park irrigation; and for effecting the timed or periodic control of mechanical movements, or the like.

Manifestly, therefore, the fluid control system of the present invention is extremely simple, compact, durable and economical in construction; is reliable, efficient and positive in action; will not readily get out of order; is rapidly and readily installed; and when employed with sprinkling apparatus large areas may be intermittently or successively irrigated or sprinkled in sections, thus eliminating waste of water and materially increasing effectiveness of the irrigation or sprinkling, further, such sprinkling apparatus require pipes of minimum size only.

While I have herein shown and described the invention with sufficient detail to enable those skilled in the art to which it pertains to understand the mode of construction and the principles involved, it is to be understood that there is no intentional limitation herein to the specific forms and precise details of construction shown and described, except as expressly defined by the appended claims, and that various modifications of the same may be resorted to without departing from the spirit of the invention or the benefits derivable therefrom. It is also to be understood that certain features of the invention herein disclosed may be employed in and with combinations other than those shown and described.

What I claim as my invention and desire to secure by Letters Patent is:—

1. In a fluid control system, the combination of fluid pressure supply means, a plurality of control units connected to said supply means and operable in sequence by the fluid pressure therein, said control units embodying means for subjecting a compressible fluid to pressure and utilizing the release of same for initiating sequential actuation of said control units.

2. In a fluid control system, the combination of fluid pressure supply means, a plurality of branches leading therefrom wherethrough the fluid is adapted to flow in sequence, and means embodying a resilient element interposed in each of said branches whereby the flow of fluid therethrough effects the opening and closing of the succeeding branch.

3. In a fluid control system, the combination of a fluid pressure supply means, a plurality of fluid discharge outlets leading therefrom wherethrough the fluid is adapted to flow in sequence, and means for controlling the time of the sequential discharge of the fluid from said outlets, said means including a resilient element adapted to be stressed by the pressure of the fluid and means for regulating the release of said stress upon said resilient element.

4. In a fluid control system, the combination of fluid pressure supply means, a plurality of fluid discharge branches leading therefrom, and a plurality of devices for effecting discharge of fluid through said branches in sequence, said devices including means for utilizing the pressure of fluid in one branch to prevent simultaneous discharge of fluid from another of said branches.

5. In fluid control system, the combination of fluid pressure supply means, a plurality of fluid discharge branches leading therefrom, and a plurality of devices for effecting discharge of fluid through said branches in sequence, each of said devices including means having a restricted passageway extending therethrough and a member adapted to further restrict said passageway and movable relative thereto during a cycle of operation of the device whereby the timing of the latter is dependent upon the restriction of the passageway by said member.

6. In a fluid control system, the combination of fluid pressure supply means, a plurality of fluid outlets leading therefrom, a fluid pressure operated valve for each of said outlets, and means for operating each of said valves in predetermined sequence, said means including a chamber into which fluid from one outlet is stored under pressure during the operation of one of said valves for use in actuating the valve of another of said outlets.

7. In a fluid control system, the combination of fluid pressure supply means, a valve for controlling the discharge of fluid therefrom, and means for actuating said valve, said means including a receptacle wherein energy is built up by the fluid under pressure, a member for actuating said valve upon release of said energy, and self-cleaning means for regulating the release of said energy.

8. In a fluid distribution system, the combination of means for supplying fluid under pressure, a valve for controlling the distribution of the fluid adapted to be opened and closed thereby, fluid compression means communicating with said fluid supply means and having a passageway leading therefrom wherethrough the fluid is released from said compression means, and means operable by the fluid pressure in said compression means and adapted to intermittently actuate said control valve for effecting distribution of the fluid under pressure.

9. In a fluid distribution system, the combination of means for supplying fluid under pressure, an intermittently actuated valve for controlling the distribution of the fluid, hydro-pneumatic compression means communicating with said fluid supply means and having a passageway leading therefrom wherethrough the fluid is released from said compression means, and means operable by the fluid pressure in said compression means and adapted to actuate said control valve for effecting distribution of the fluid under pressure.

10. In a fluid control system, the combination of fluid pressure supply means, a plurality of fluid distribution branches leading therefrom, and a plurality of devices for controlling the discharge of fluid from said branches in sequence, said devices including means for accumulating fluid under pressure, utilizing same in actuation of said discharge, and returning said fluid after utilization to one of said distribution branches.

11. In a fluid pressure control system, the combination of fluid pressure supply means, a plurality of outlets leading therefrom, a fluid pressure operated valve for one of said outlets, a hydro-pneumatic accumulator, means for transmitting pressure therefrom to said valve, and intermittently actuated means for gradually reducing said pressure and utilizing the same for actuating said valve for a predetermined period.

12. In a fluid control system, the combination of fluid pressure supply means, a plurality of fluid outlets leading therefrom, a fluid pressure operated valve for one of said outlets, a pilot valve therefor, a receptacle wherein fluid under pressure from one of said outlets is accumulated, means for transmitting said pressure to said pilot valve, a restricted passageway by which said pressure is relieved, and means for controlling the effective capacity of said passageway.

13. In a fluid control system, the combination of a fluid pressure supply means, a plurality of fluid outlets leading therefrom, a fluid pressure operated valve for one of said outlets, a receptacle wherein fluid under pressure from another of said outlets is accumulated, said receptacle having a restricted passageway leading therefrom through which said pressure is gradually released, and means for transmitting said pressure from said receptacle to said valve for actuating the latter.

14. In a fluid control system, the combination of fluid pressure supply means, a plurality of control units connected to said supply means and operable in sequence, said control units embodying pressure accumulators, and means for utilizing the rate of release of said pressure in timing the discharge periods of said control units.

15. In a fluid control system, the combination of fluid pressure supply means, a plurality of control units therefor, one of said units having a pilot valve, a pressure operated main valve responsive to said pilot valve, a receptacle for storing fluid under pressure having a passageway communicating with the discharge side of another one of said control units, and a movable member in said passageway whereby pressure is transmitted to said pilot valve.

16. In a fluid control system, the combination of a fluid pressure supply means, a plurality of units for controlling the discharge of fluid therefrom, one of said units having a pressure operated main valve, a pilot valve therefor, a receptacle for storing fluid under pressure having a passageway communicating with the discharge side of another of said control units, a movable member for transmitting pressure from said receptacle, and means for controlling the release of pressure stored in said receptacle.

17. In a fluid control system, the combination of fluid pressure supply means, a plurality of fluid discharge outlets leading therefrom, valve means therefor adapted to operate in timed sequence, and devices including means for producing pneumatic pressure and utilizing the latter to release for a predetermined period the closing pressure of said valve means.

18. In a fluid distribution system, the combination of means for supplying fluid under pressure, a device for effecting distribution of said fluid under pressure, a controller for said device including a cylinder, a spring-pressed piston reciprocally mounted therein, said piston having a restricted passageway extending therethrough, and a member in said passageway adapted for periodic movement relative thereto for maintaining its effective capacity.

19. In a fluid control system, the combination of fluid pressure supply means, a plurality of discharge branches leading therefrom, a fluid pressure operated valve on each of said branches, and a plurality of devices connected to said valves for operating same in repetitive sequence, each of said devices embodying a resilient element adapted to be intermittently stressed by the fluid pressure passing through one valve for actuating another valve.

20. In a fluid control system, the combination of fluid pressure supply means, a plurality of fluid distribution branches leading therefrom, a fluid pressure operated valve on each of said branches, and devices connected to said valves for operating same in sequence, each of said devices embodying a fluid pressure receptacle having a constricted connection with one of said branches, and a member cooperating with said connection and responsive to fluid pressure passing to and from said receptacle whereby actuation of one of said valves is effected.

21. In a fluid control system, the combination of fluid pressure supply means, a plurality of discharge branches leading therefrom, a fluid pressure operated valve on each of said branches, a pilot valve for each of said fluid pressure operated valves, and devices for operating said pilot valves in sequence, each of said devices embodying a chamber communicating with a discharge branch, a reciprocable member in said chamber responsive to the fluid pressure in said discharge branch, said member having a restricted passageway extending therethrough, and means co-operating with said passageway having operative movement relative thereto for maintaining the effective capacity thereof.

22. In a fluid control system, the combination of fluid pressure supply means, a plurality of discharge branches leading therefrom, valves on said branches, means for operating each of said valves in sequence, said means including a cylinder, a piston reciprocatively mounted therein, a tubular piston rod, and a member disposed within said piston rod and periodically movable relative thereto for maintaining a restrictive effective capacity for the bore of said tubular piston rod.

23. In a fluid control system, the combination of fluid pressure supply means, a plurality of discharge branches leading therefrom, pilot controlled valves for said discharge branches, each of said valves being adapted to be opened and closed by pressure from its own branch, and means for actuating each of the controlling pilots in sequence.

24. In a fluid control system, the combination of fluid pressure supply means, a plurality of discharge branches leading therefrom, each having a valve adapted to be opened and closed by fluid pressure from the branch which it controls, and a plurality of devices adapted to release for a predetermined period the closing pressure of each of said valves in sequence.

25. In a fluid control system, the combination of fluid pressure supply means, a plurality of fluid discharge branches leading therefrom, and a plurality of devices for effecting discharge of fluid through said branches in sequence, each of said devices including an element adapted for automatic reciprocation therein whereby the timing of said device is dependent upon the rate of flow of fluid passing through said element.

26. In a fluid control system, the combination of fluid pressure supply means, a plurality of discharge branches leading therefrom, each of said branches having a valve adapted to be opened and closed by the fluid pressure in said system, and a control unit for each of said valves embodying means operable by the fluid discharged from the system for effecting storage of energy therein and utilizing said energy to sequentially release for predetermined periods the closing pressure on said valves.

27. The combination with a fluid pressure supply valve of a pilot mechanism therefor comprising fluid pressure storage means, a housing connected to said storage means, fluid pressure supply means adapted to intermittently supply fluid pressure to said storage means through said housing, a member disposed in said housing and responsive to fluid pressure from said storage means and adapted to actuate said pilot mechanism, a restricted passageway through which pressure in said storage means is relieved and a periodically moving element for maintaining the effective capacity of said passageway.

28. In a fluid control system the combination of fluid pressure supply means, a plurality of discharge branches leading therefrom, valves on said branches, means for operating said valves in sequence, said means including a cylinder, a piston reciprocatively mounted therein, a restricted passageway connecting said cylinder with said fluid pressure supply means, and means whereby said passageway is periodically cleaned to maintain its capacity.

29. In a fluid control system, the combination of fluid pressure supply means, a plurality of fluid discharge outlets leading therefrom, and a plurality of devices for controlling the discharge of fluid from said outlets, said devices being adapted to actuate each other in sequence and each embodying a member yieldable in opposite directions to resilient means.

30. In a fluid control system, the combination of fluid pressure supply means, a plurality of discharge branches leading therefrom, a plurality of valve control devices including a movable valve member adapted to be continuously subjected to fluid pressure from the branch which it controls, a piston member operatively connected to said movable valve member in axial alignment therewith, said valve and piston members having restricted passageways extending therethrough, through which fluid pressure is transmitted, and means for applying and releasing fluid pressure to the piston member of each valve device for effecting operation of said valve devices in timed sequence.

31. In a fluid control system, the combination of fluid pressure supply means, a plurality of discharge branches leading therefrom, devices on each of said branches for automatically opening and closing said branches, each of said devices including a valve housing, a cylinder connected thereto in axial alignment, a piston disposed for reciprocation in said cylinder, a valve member reciprocatively disposed in said valve housing for co-action with said piston, said piston and valve member having restricted passageways extending therethrough, through which fluid under pressure is admitted to said cylinder, a conduit extending from said cylinder through which said fluid is released to the atmosphere, a pilot valve on said conduit, and means for opening and closing the pilot valves of said devices in sequence.

ERNEST LAMAR GAINES.